United States Patent
Weijers

(10) Patent No.: US 7,946,218 B2
(45) Date of Patent: May 24, 2011

(54) APPARATUS FOR PREPARING A BEVERAGE

(75) Inventor: Marcel Hendrikus Simon Weijers, Hoogeveen (NL)

(73) Assignees: Martex Holland B.V., Veenendaal (NL); Electrical & Electronics Ltd., Hong Kong (CN); Coval Art Tec Limited, Limassol (CY)

( * ) Notice: Subject to any disclaimer, the term of this patent is extended or adjusted under 35 U.S.C. 154(b) by 316 days.

(21) Appl. No.: 11/722,236

(22) PCT Filed: Dec. 21, 2004

(86) PCT No.: PCT/EP2004/053641
§ 371 (c)(1),
(2), (4) Date: Sep. 27, 2007

(87) PCT Pub. No.: WO2006/066621
PCT Pub. Date: Jun. 29, 2006

(65) Prior Publication Data
US 2008/0095903 A1 Apr. 24, 2008

(51) Int. Cl.
*A47J 31/057* (2006.01)
(52) U.S. Cl. .......................... 99/300; 99/302 P
(58) Field of Classification Search ............ 99/279–323, 99/275–277, 495, 452–455; 219/689; 361/103–104; D7/317–318, 339–397
See application file for complete search history.

(56) References Cited

U.S. PATENT DOCUMENTS

| | | |
|---|---|---|
| 3,288,049 A | 11/1966 | Schmid |
| 3,317,706 A | 5/1967 | Fischer |
| 3,865,277 A | 2/1975 | Rimini |
| 3,960,297 A | 6/1976 | Stephens et al. |
| 4,469,131 A | 9/1984 | Traylor |
| 5,134,925 A | 8/1992 | Bunn et al. |
| 5,287,797 A | 2/1994 | Grykiewicz |
| 5,299,595 A | 4/1994 | Ribeiro |
| 5,613,422 A | 3/1997 | Giuliano |
| 6,021,705 A | 2/2000 | Dijs |
| 6,335,853 B1 * | 1/2002 | Kitagawa et al. ............. 361/103 |
| 6,968,774 B1 * | 11/2005 | Bodum ............................ 99/285 |
| 6,973,870 B2 * | 12/2005 | Alves .............................. 99/303 |

(Continued)

FOREIGN PATENT DOCUMENTS

DE 20218339 4/2003

(Continued)

OTHER PUBLICATIONS

Official Search Report of the European Patent Office in counterpart foreign application No. PCT/EP2004/053641 filed Dec. 21, 2004.

(Continued)

*Primary Examiner* — Thor S Campbell
(74) *Attorney, Agent, or Firm* — Steven M. Koehler; Westman, Champlin & Kelly, P.A.

(57) ABSTRACT

The invention relates to an apparatus (1) for preparing a beverage (2) comprising a brew chamber (10) defining a volume for containing at least one container (11) with a soluble or extractable product for preparing said beverage, wherein said apparatus comprises adjustment means (12, 14) for varying the volume (V) of said brew chamber. Preferably the adjustment means include a cover member (12) with a piston portion (25). The invention also relates to a method for preparing a beverage.

14 Claims, 9 Drawing Sheets

U.S. PATENT DOCUMENTS

| | | | |
|---|---|---|---|
| 2002/0083843 | A1 | 7/2002 | Dam |
| 2004/0025701 | A1 | 2/2004 | Colston et al. |
| 2004/0031394 | A1 | 2/2004 | Yoakim et al. |
| 2008/0202612 | A1 | 8/2008 | Weijers et al. |
| 2008/0210098 | A1 | 9/2008 | Weijers et al. |

FOREIGN PATENT DOCUMENTS

| | | |
|---|---|---|
| EP | 0606042 | 11/1993 |
| EP | 0838186 | 4/1998 |
| EP | 0904717 | 9/1998 |
| FR | 2364640 | 9/1976 |
| FR | 2842092 | 7/2001 |
| FR | 2842090 | 7/2002 |
| GB | 1119891 | 7/1968 |

OTHER PUBLICATIONS

Notification of Transmittal of The International Preliminary Report on Patentability.

Weijers, Office Action mailed Jun. 24, 2010, file date Sep. 27, 2007, U.S. Appl. No. 11/722,242.

Preliminary Amendment for U.S. Patent Application 11/722,242 submitted to the US Patent Office on Jul. 10, 2007.

Preliminary Amendment submitted to US Patent Office on Jul. 10, 2007 for U.S. Appl. No. 11/722,234, filed Sep. 27, 2007, pp. 1-19.

Preliminary Amendment submitted to US Patent Office on Jun. 20, 2007 for U.S. Appl. No. 11/722,234, filed Sep. 27, 2007, pp. 1-11.

Weijers, Office Action mailed Jan. 27, 2010, file date Sep. 27, 2007, U.S. Appl. No. 11/722,234, pp. 1-7.

Weijers, Final Office Action mailed Jun. 15, 2010, file date Sep. 27, 2007, U.S. Appl. No. 11/722,234, pp. 1-8.

Response filed Dec. 23, 2010 for U.S. Appl. No. 11/722,242 filed Jun. 20, 2007, pp. 1-18.

Response filed Apr. 27, 2010 for U.S. Appl. No. 11/722,234 filed Jun. 20, 2007, pp. 1-12.

Response filed Dec. 15, 2010 for U.S. Appl. No. 11/722,234 filed Jun. 20, 2007, pp. 1-8.

* cited by examiner

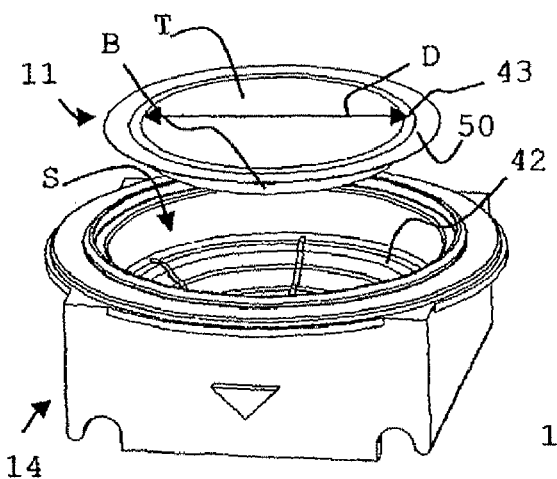
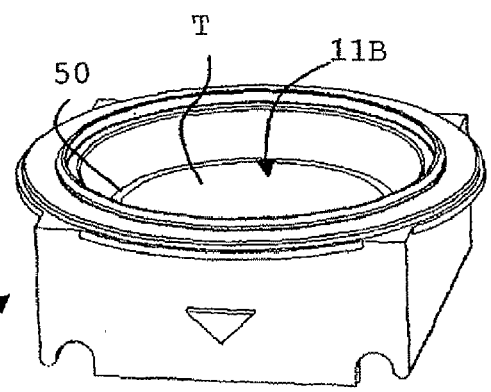
Fig. 7A	Fig. 7B
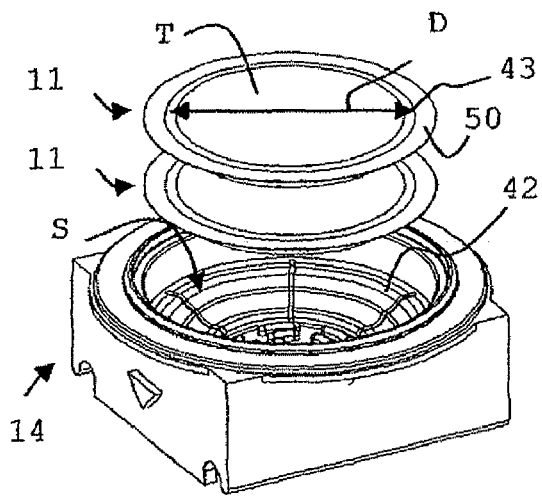
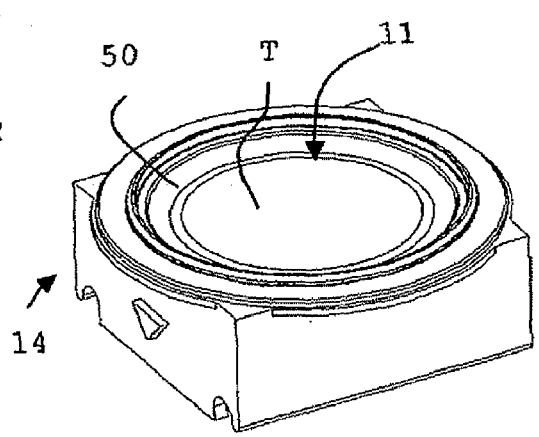
Fig. 7C	Fig. 7D

US 7,946,218 B2

APPARATUS FOR PREPARING A BEVERAGE

CROSS-REFERENCE TO RELATED APPLICATION

The present application is a National Stage filing of and claims priority of International patent application Serial No. PCT/EP2004/053641, filed Dec. 21, 2004, and published in English.

BACKGROUND

The invention relates to an apparatus for preparing a beverage fit for consumption, such as coffee, tea, chocolate and cappuccino. More specifically, the invention relates to an apparatus for preparing a beverage comprising a brew chamber defining a volume for containing at least one container with a soluble or extractable product for preparing said beverage.

EP-A-0 904 717 discloses an apparatus with a holder with an inner space for a pill-shaped pouch, manufactured from filter paper and filled with ground coffee, that rests on the bottom of the inner space. The inner space is closed off by a cover. The cover comprises an opening through which, via a hose, hot water can be fed to the inner space. Adjacent its circumferential edge, the cover further comprises a sealing ring closed in itself.

A problem associated with the prior art holder is that this holder is not suitable for pouches or containers of different diameters that are available on the market or multiple containers.

SUMMARY

An apparatus for preparing a beverage comprising a brew chamber defining a volume for containing at least one container with a soluble or extractable product for preparing said beverage, wherein said apparatus comprises an adjustment device for varying the volume of said brew chamber.

By enabling the apparatus to vary the volume of the brew chamber by the adjustment device, the brew chamber volume can be adjusted to the number and/or dimensions of the containers for each individual operation of the apparatus. Accordingly, an apparatus with an adaptable brew chamber is obtained. The prior art apparatus uses different holders of different dimensions for such situations.

The embodiments of the invention as defined in claims provide for suitable embodiments for varying the volume of the brew chamber.

An embodiment of the invention as defined in claim 4 has the advantage that pressure variations in the boiler can be applied to obtain motion of the piston portion during operation for varying the volume of the brew chamber.

An embodiment of the invention as defined in claim 5 provides for a suitable mechanism to retract the piston portion from the container after operation to allow the container and/or holder to be removed. The spring element further ensures robust operation of the apparatus.

An embodiment of the invention provides for the advantage that less residual water is left in the holder since the piston portion not only confines the container in the holder but also encapsulates the container.

An embodiment of the invention allows heated water to pass the adjustment means, in particular for the piston portion.

An embodiment of the invention allows the apparatus to combine the functions of adjusting the brew chamber during operation and passing water into the brew chamber while preventing water, e.g. from a boiler, to flow into the brew chamber before and after operation. The embodiment further limits the compression force of the piston portion on the container such that the product in the container is not compressed to a density wherein water is substantially prevented to pass through the product.

An embodiment of the invention allows the valve to maintain in a closed state when the apparatus is not operated.

An embodiment of the invention provides a safety mechanism to prevent damage of components of the apparatus.

An embodiment of the invention has the advantage that by providing multiple holding structures, e.g. support structures designed as terraces in the holder, containers of different dimensions fit into the holder. Accordingly, chances of bypass of water and damage of the container are reduced when using the same holder for containers of different size.

An embodiment of the invention has the advantage of efficient heating. As a beverage is typically prepared for one or two cups, only a limited amount of energy is stored by the water flowing between the heating device and the cup. By integrating the heating device and the brew chamber, the heat absorbing mass for the passage of heated water is reduced and, accordingly, the temperature drop of the liquid flowing from the heating device to the cup is reduced.

An embodiment of the invention has the advantage that displacement of the container and shear stresses exerted on the seal between the cover member and the holder are substantially omitted and chances of leakage are reduced.

The invention further relates to a method for preparing a beverage with an apparatus comprising a brew chamber defining a volume for containing at least one container with a soluble or extractable product for preparing said beverage, comprising the step of varying the volume of said brew chamber prior to preparing said beverage. It should be acknowledged that the phrase 'prior to preparing said beverage' refers to the moment before which water is allowed to flow through the product in the container.

By varying the volume of the brew chamber, the brew chamber volume can be adapted to the number and/or dimensions of containers for each individual operation of the apparatus. Accordingly, an adaptable brew chamber is obtained.

BRIEF DESCRIPTION OF THE DRAWINGS

Aspects of the invention will be further illustrated with reference to the attached drawings, which schematically show preferred embodiments according to the invention. It will be understood that the invention is not in any way restricted to these specific and preferred embodiments.

In the drawings:

FIG. 7A-7D show holders containing one or two containers;

DETAILED DESCRIPTION OF ILLUSTRATIVE EMBODIMENT

Figure 1:
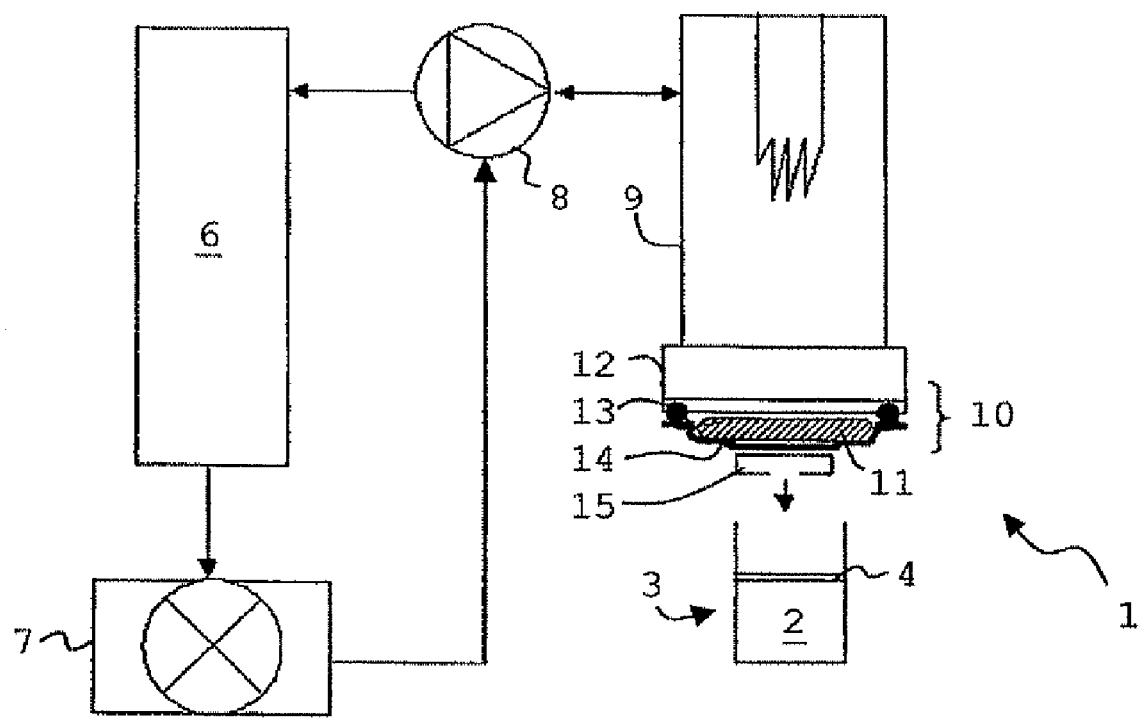
FIG. 1 is a schematic illustration of an apparatus according to an embodiment of the invention.

FIG. 1 is a schematic illustration of an apparatus 1 for preparing a beverage 2 suitable for consumption in a cup 3 with a fine-bubble froth layer 4. The apparatus 1 is capable of producing beverages 2, such as coffee, tea, chocolate or cappuccino, in a predetermined volume, typically one or two cups. The apparatus comprises a water container 6 for fresh water for the preparation of the beverage 2, a pump 7, a valve system 8 and a heating device 9, such as a boiler or a thermo block, from which heated water is delivered into a brew chamber 10. The heating device 9 will hereinafter also be referred to as boiler 9. The boiler 9 may e.g. heat the water to a temperature of 96° C. The brew chamber 10 involves the volume available for a container 11 with a filter, also referred to as pad, pod or pouch, pre-packed with a soluble or extractable product to obtain the brewed beverage 2 after the pressurized liquid has passed through the product. The brew chamber 10 has a cover member 12 attached to the boiler 9, a closing seal 13 and a holder 14 enclosing the container 11. The apparatus 1 has a frothing device 15 for providing the fine-bubble froth layer 4 for the beverage 2.

In operation, water from the water container 6 is fed to the pump 7 to inject the water under pressure via the valve system 8 into the boiler 9. The pressure from the pump for the liquid is in the range of 1.2-3 bar, preferably 1.4-2.5 bar. In the boiler 9, water is heated till it has a temperature just below the boiling point. Expansion water during heating is guided through the valve system 8 back into the water container 6. Subsequently, heated and pressurized water is provided via the closure member 12 into the brew chamber 10 where it passes through the container 11 to obtain a brewed beverage. After the brewed beverage is output from the container 11, it passes the frothing device 15 that adds the fine-bubble froth layer 4 to the beverage 2 in the cup 3.

The user of the apparatus 1 may select the number of cups 3 with a beverage 2 he likes to obtain. If the user requires two cups 3, he applies two containers 11 in the holder 14 as illustrated schematically in FIGS. 2A and 2B. The volume V of the brew chamber 10 is adjusted to an appropriate volume for the two containers 11 by adjustment means involving either movement of the cover member 12 (FIG. 2A) or the holder 14 (FIG. 2B) with respect to each other, indicated by the arrow M. It should be appreciated that alternatively, both the cover member and holder 14 may move to adjust the volume V appropriately.

Figure 2A:
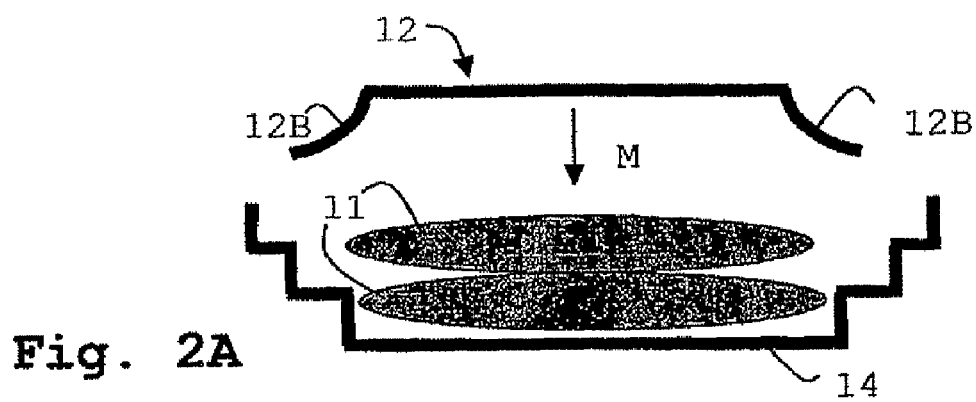
FIGS. 2A-2D show schematic illustrations for varying the volume of the brew chamber of FIG. 1 according to an embodiment of the invention.
Figure 2B:
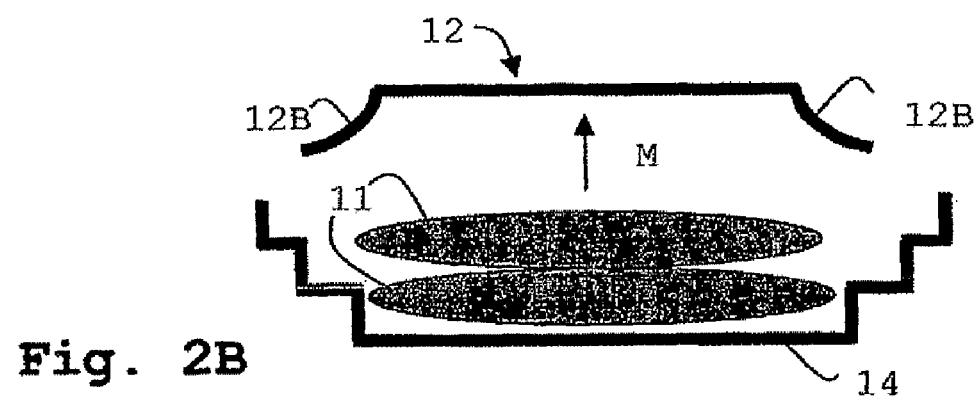
Figure 2C:
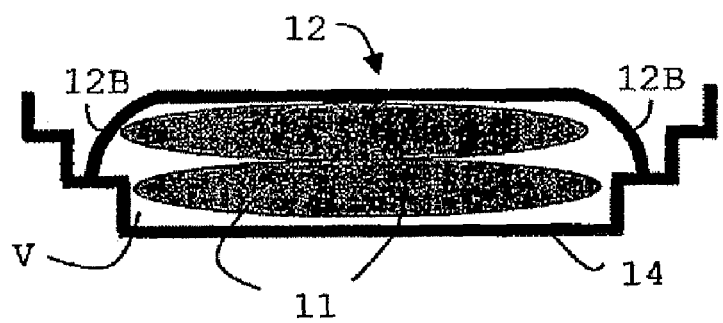
Figure 2D:
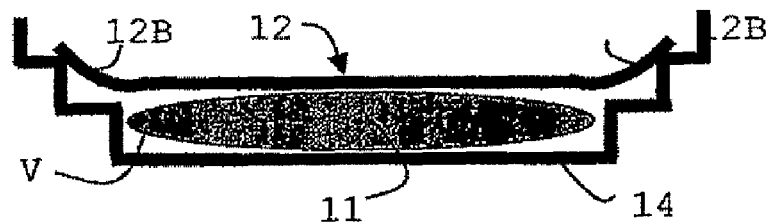

FIG. 2C shows the situation wherein the volume V of the brew chamber 10 is adjusted for two containers 11. If the brew chamber 10 should only contain a single container 11, the brew chamber 10 is adjusted accordingly as displayed in FIG. 2D. In the embodiment of FIGS. 2C and 2D, flexible wings 12B assist in closing the volume V of the brew chamber 10.

Figure 3:
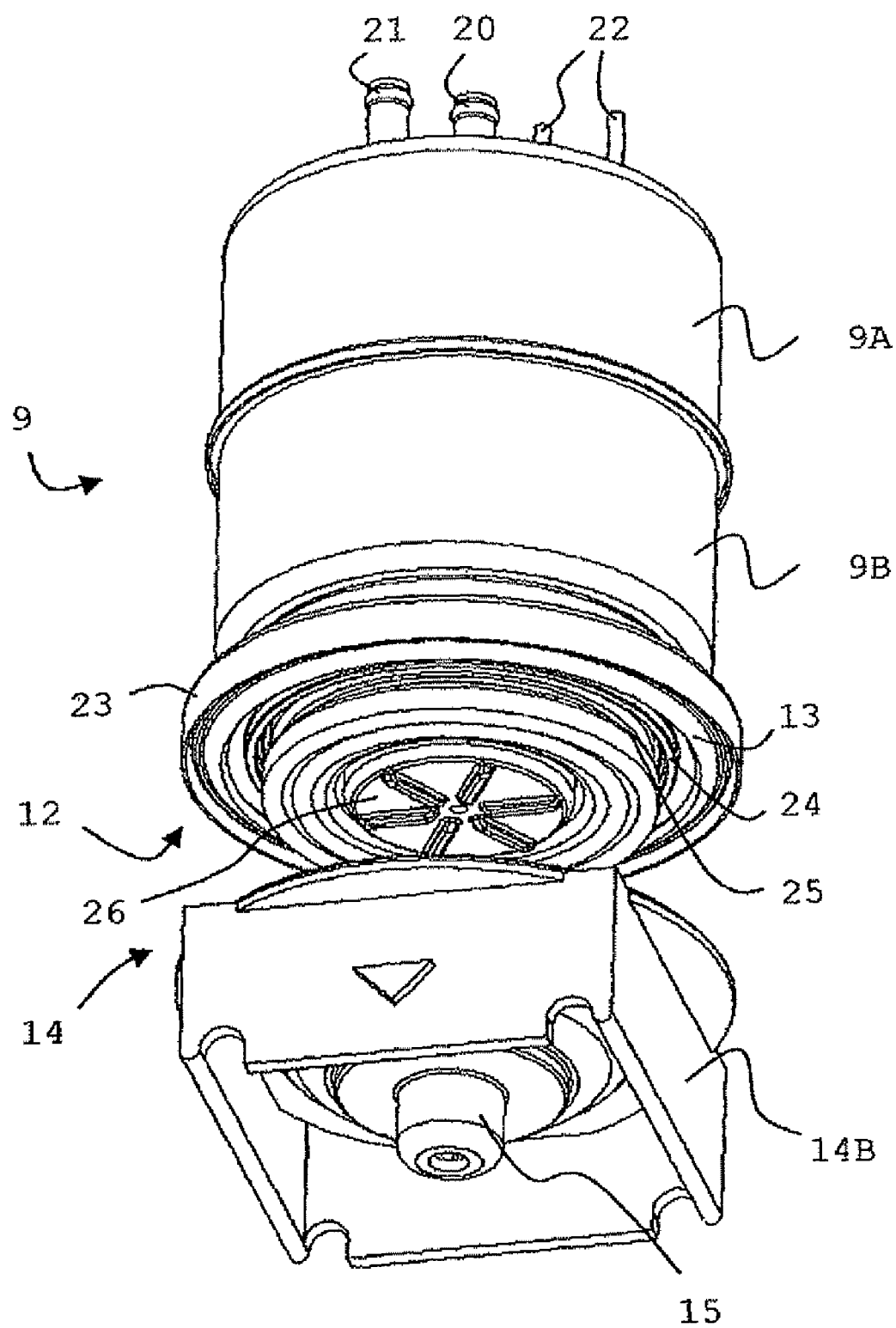
FIG. 3 shows an image of a heating device and a holder as separate parts according to an embodiment of the invention.
Figure 4:
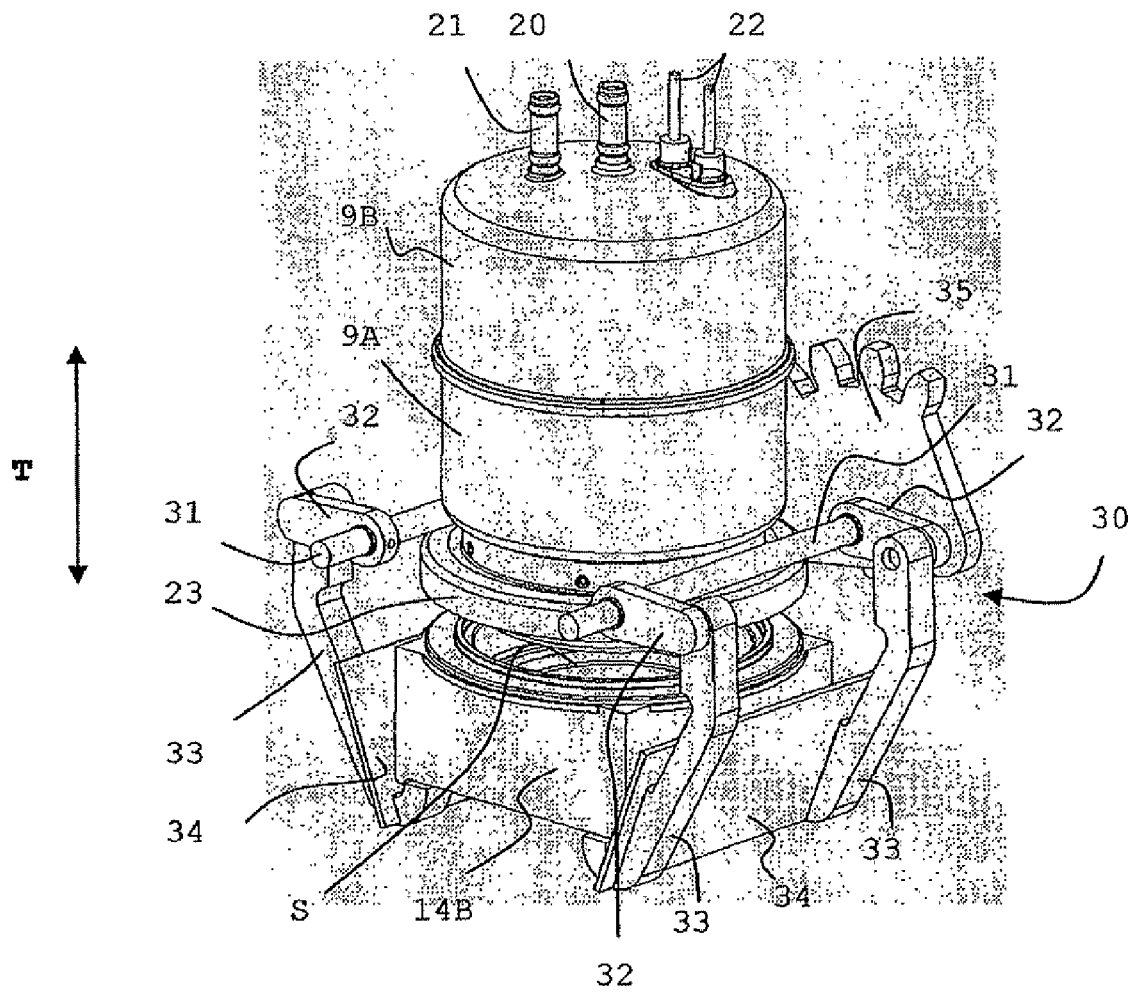
FIG. 4 shows an image of the heating device and the brew chamber in an open state, including closing means, according to an embodiment of the invention.

FIGS. 3 and 4 show images of the boiler 9 and a holder 14. The boiler 9 may be of a metal, such as stainless steel or aluminum, or plastic. The boiler 9 comprises a top section 9A from which a water inlet 20 and an expansion water outlet 21 can be connected in fluid communication with the valve system 8. Further, terminals 22 are available as electrical connections for heating of the water in the boiler 9. It is noted that the boiler 9 does not necessarily comprise a top section 9A and a bottom section 9B, but may be a single unit.

The bottom section 9B of the boiler 9 has attached the cover member 12 via a brew chamber lid 23 to close the brew chamber 10 assisted by the closing seal 13. Accordingly, heated water from the boiler 9 does not have to pass intermediate parts, but is directly delivered into the brew chamber 10. As a result, the temperature difference between the water from the boiler 9 and of the beverage 2 in the cup 3 is reduced.

The cover member 12 further comprises a connection ring 24 for attaching a silicon piston portion 25, provided with a valve 60 (shown in FIGS. 8-11) and a water distribution plate 26.

The holder 14, completed by the cover member 12 to constitute the brew chamber 10 is adapted to accommodate one or more containers 11 in the inner space S, as will be further explained with reference to FIGS. 5-7D.

In order for the holder 14 to approach the boiler 9 to complete the brew chamber 10, a closing assembly 30 is employed as displayed in FIG. 4. The closing assembly 30 allows the holder 14, shown without the container 11, to move to the cover member 12, substantially by translation T. In the present embodiment, the boiler 9 is arranged as a load bearing component of the closing assembly 30 by supporting rotatable shafts 31 on the upper surface of the brew chamber lid 23, while the latter is itself rigidly fixated to the boiler 9. The rotatable shafts 31 are each on one side rigidly connected to cranks 32. The cranks 32 each have a rotating connection with a clamping arm 33 adapted to snap fit with the holder 14. The clamping arms 33 comprise plates 34 to effectively clamp the holder 14 during the translation T. The external part 14B of the holder 14 is shaped to perform allow the plates 34 to abut to walls of the part 14B. The rotatable shafts 31 are further each fixated to gear wheel segments 35A, 35B arranged to interact with each other during the translation T. The gear wheel segments 35A, 35B each receive a clamping arm 33 as well, such that the clamping arm 33 and gear wheel segments 35 (only one gear wheel segment is visible) may rotate with respect to each other. It should be appreciated that the gears wheel segments 35 may as well be full gear wheels. The gear wheel segments 35 are driven to translate the holder 14. The closing assembly 30 is further described in a co-pending application ("Apparatus for preparing a beverage") of the applicants filed on the same date that is incorporated in the present application herewith by reference with respect to the structure and function of the closing assembly 30.

Figure 5:
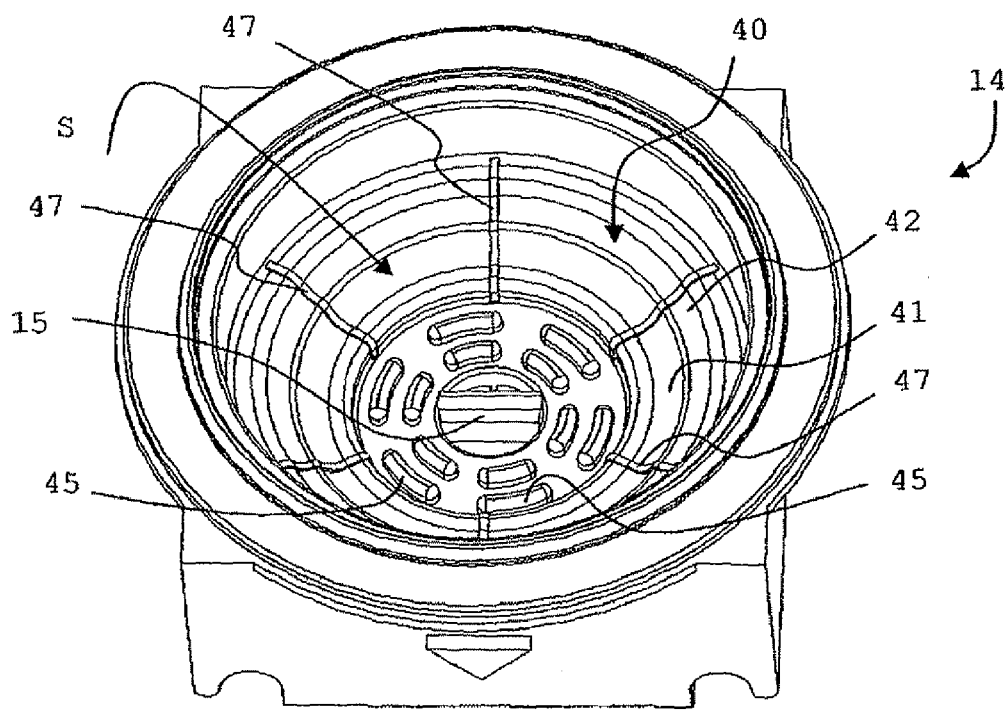
FIGS. 5 and 6 depict a holder in perspective view and in cross-section according to an embodiment of the invention.
Figure 6:
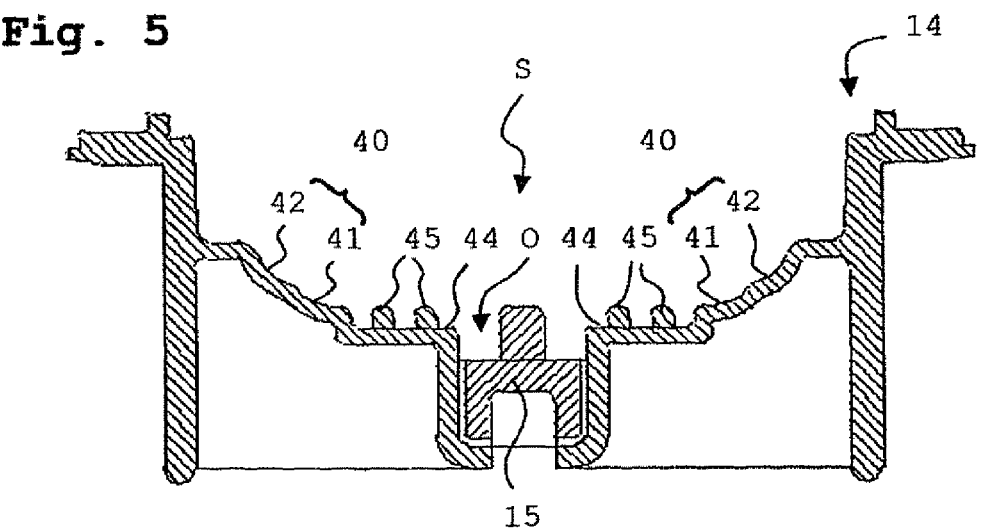

FIGS. 5 and 6 depict a holder 14 in perspective view and in cross-section respectively according to an embodiment of the invention. The holder 14 has an inner space S for accommodating or supporting the container 11 as will be further illustrated with reference to FIGS. 7A-7D. The inner space S has a non-planar surface 40 with a first holding structure 41 and a second holding structure 42 that are respectively arranged to hold containers 11 of a first dimension and a second dimension substantially along an edge 43 of said containers, as illustrated in FIGS. 7A-7D. The non-planar surface 40 has levels, terraces, steps or other types of holding structures that are arranged to support containers 11 of different dimensions. As the holder 14 forms a bowl, the first and second holding structures 41, 42 are circular structures in the form of annular rings, one surrounding the other. It should be appreciated that the holding structures 41, 42 are not necessarily provided around the full circumference of the inner space S, although an all-around presence of the holding structures 40, 41 contributes to the performance of the holder in terms of bypass of water and stability of the container 11. The outer diameter of the inner space S is just smaller than the largest diameter of the container 11 envisaged to be applied.

The holder 14 has a flat circular central surface 44 at the bottom of the inner space S with an opening O for passing the brewed substance. The central surface is provided with spacer structures or projections 45 extending from the surface 44 and defining the extraction area for the brewed substance. The spacer structures 45 prevent the bottom of the container 11 to abut against the flat closed surface 44 which otherwise would result in a serious barrier for the brewed substance in leaving the container 11. The spacer structures 45 provide for an appropriate distance between the flat surface 44 and the lower filter of the container 11. The spacer structures 45 may have a height of e.g. 2 millimeter. The diameter of the circular central surface may be smaller than the diameter smallest container 11 to be used with the holder 14.

For containers 11B with large dimensions, the second holding structure 42 holds the edge 43, while the bottom filter B rests in the centre on the spacer structures 45. To prevent rupture of the container 11B, there exists a smooth transition between the structures on the non-planar surface 40.

The non-planar surface 20 comprises ribs 47 defined in a direction, here a radial direction, between the first holding structure 41 and the second holding structure 42 of said non-planar surface 40. The ribs 47 prevent vacuum suction when removing the container 11 after operation of the apparatus 1. It should be appreciated that the height of these ribs 47 should preferably be limited, e.g. less than 0.2 millimeter, to prevent bypass of water.

FIGS. 7A-7D show holders 14 and containers 11. The containers 11 each have an top filter T and a bottom filter B that are attached to each other at a seam 50 to contain a product, such a ground coffee, for the beverage. Typical container dimensions vary between 44 and 62 mm in diameter D, not including the width of the seam 50, and 5-50 mm in thickness d. FIGS. 7A and 7B show a large, asymmetric, container 11 with a diameter D of 62 mm and a thickness d of 6 mm before and after insertion in a holder 14. The edge 43 of the container 11 is held by the annular holding structure 42.

In FIGS. 7C and 7D, the situation is shown of two containers 11 inserted in a single holder 14, as already discussed with reference to FIGS. 2A and 2B. The depth of the inner space S of the holder 14 may be sufficient to fit at least one container 11 of the largest thickness d or two containers 11 of the smallest thickness d.

The holder 14 is further described in a co-pending application ("Apparatus for preparing a beverage") of the applicants filed on the same date that is incorporated in the present application herewith by reference with respect to the structure and function of the holder 14.

Figure 8:
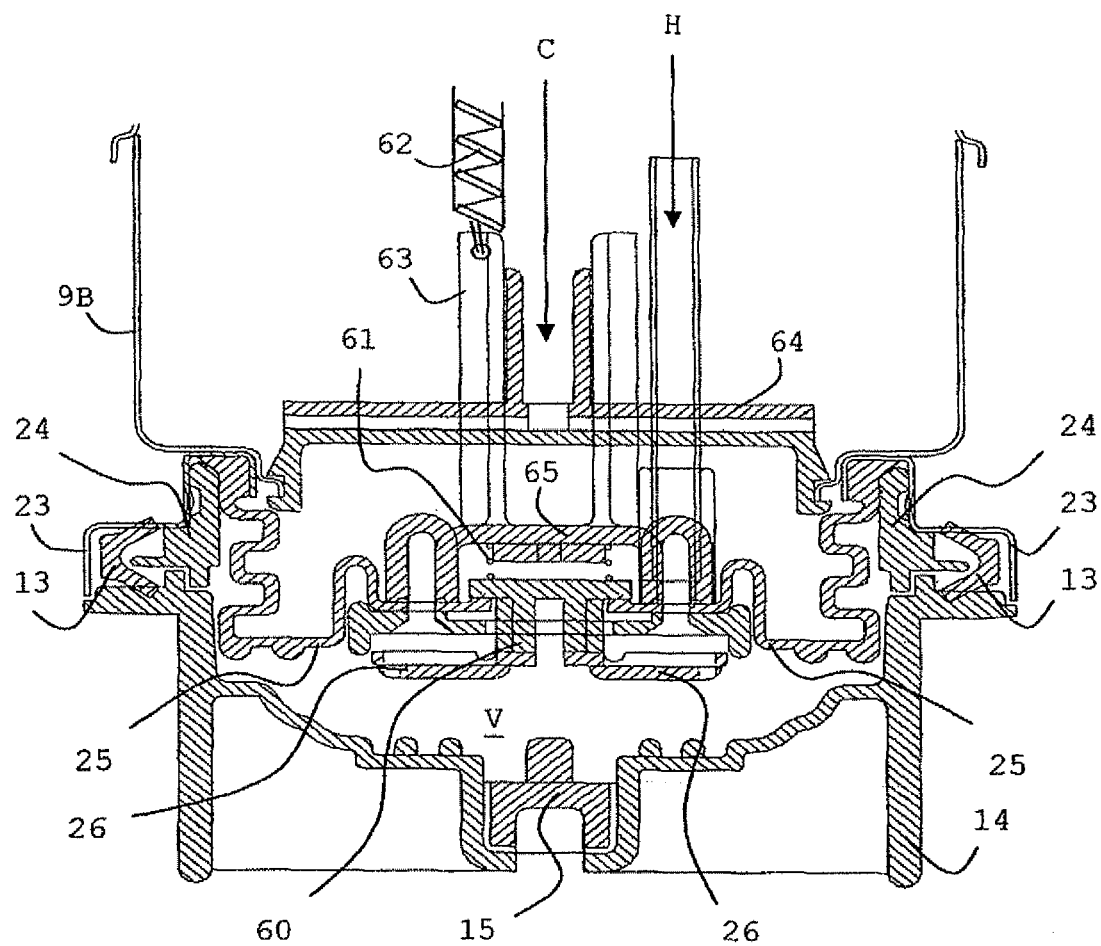
FIG. 8 depicts a cross-section of a detailed portion of the adjustment means according to an embodiment of the invention.

FIG. 8 shows a detailed cross-section of a portion of the embodiment of FIG. 3, wherein the holder 14 is attached to the boiler 9. In particular, FIG. 5 shows a detailed image of the cover member 12 and the holder 14. The cover member 12 comprises the brew chamber lid 23, a silicon piston portion 25, a water distribution plate 26 and a valve 60 including a spring element 61. The brew chamber lid 23 is rigidly fixated to the boiler 9. The connection ring 24 has been pressed in from below to fixate the closing seal 13 and the silicon piston portion 25. The piston portion 25 is coupled to a spring element 62 arranged to exert spring force action on said piston portion 25 away from the holder 14. The spring element 62 is supported in the boiler 9 and is guided by guiding rails 63.

Clearly, the piston portion 25 separates an internal volume of the boiler from the volume V of the brew chamber 10. The side of the piston portion 25 facing the boiler volume further comprises a cold water distributor 64 and a hot water distributor 65 for appropriate water circulation in the boiler 9. Cold water from the valve system 8 is distributed near the bottom of the boiler 9, indicated by the arrow C, where it is heated by a heating element (not shown in FIG. 8). Heated water is subsequently picked up in the upper half of the boiler 9, indicated by the arrow H, and fed in the brew chamber 10 if allowed by the valve 60. It is noted that the conduits for supplying the cold water and heated water to the cold water distributor and hot water distributor are only partly drawn.

Figures 9A, 9B:
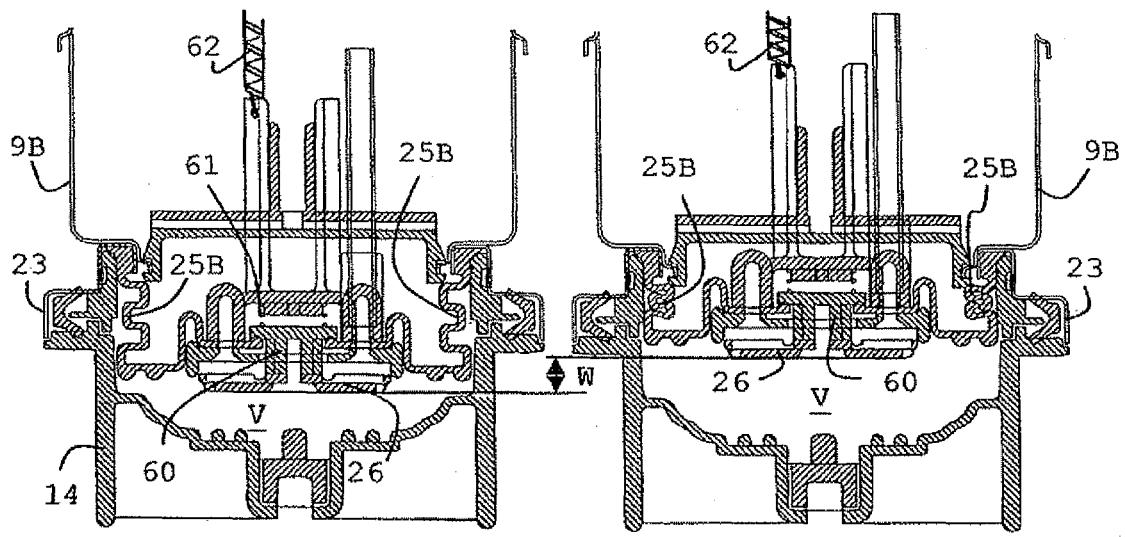
FIGS. 9A and 9B illustrate the function of the piston portion of the cover member according to an embodiment of the invention.

FIGS. 9A-11 illustrate the operation of the apparatus 1. In operation, water in the boiler 9 is heated to a temperature of e.g. 96° C. Pre-heating of the brew chamber 10 is performed by thermal conduction of the heat generated within the boiler 9 through the piston portion 25. As pressure builds up in the boiler 9 by operating the pump 7, the flexible piston portion 25 moves towards the container 11 until the water distribution plate 26 touches the container 11. Motion of the piston portion 25 is facilitated by the accordion-shaped section 25B. FIG. 9A illustrates a first position (active state) of the piston portion 25 wherein the accordion-shaped section 25B is stretched to a certain extent, while FIG. 9B illustrates a second position (inactive state), wherein the accordion-shaped section is substantially folded. The maximum distance over which the piston portion 25 may move may be dependent on the type of container 11 and the embodiment of the apparatus 1. As an example, the distance W is in the range of 5-20 mm, e.g. 10 mm.

Subsequently, the piston portion 25 contacts the container or containers 11, i.e. by the water distribution plate 26 in the described embodiment. The holding structures 41, 42 assist in centering of the container(s) 11. The piston portion 25 substantially encapsulates the container 11 to hold the container 11 in position, thereby defining the appropriate volume V of the brew chamber 10.

Figure 10:
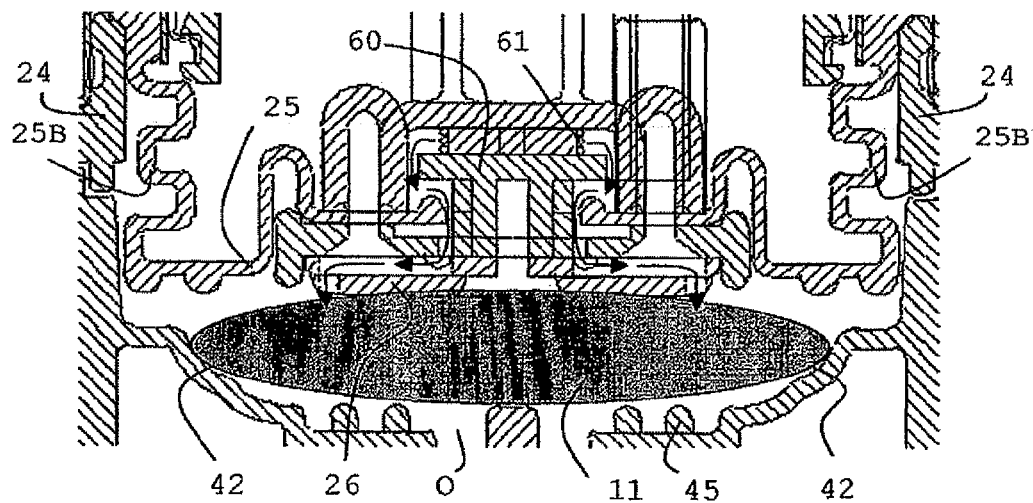
FIG. 10 illustrates the function of the valve integrated in the piston portion according to an embodiment of the invention.

When sufficient force, determined by the spring element 61, develops, the valve 60 opens to pass water from the boiler 9 to the container 11 in the pre-heated brew chamber 10, as illustrated in FIG. 10 by the arrows. The structure of the valve 60 and spring element 61 are such that in the inactive state of FIG. 9B, the valve 60 does not substantially leak water from the boiler 9 (e.g. due to gravity), while in the active state of FIG. 10, water easily flows from the boiler 9 into the brew chamber 10. In this active state, the pressure difference between the boiler 9 and the brew chamber 10 is virtually zero, resulting in a reduced or negligible compression force of the piston portion on the product in the container 11 allowing water to pass through the product to the opening O in the holder 14. The actual shape, dimension or number of containers 11 is not relevant, as the flexible piston portion 25 is adapted to adjust the volume of the brew chamber 10.

Once brewing is completed, the pump 7 stops operating and the pressure in the apparatus 1 drops to zero. The piston portion 25 moves back to the inactive state displayed in FIG. 9B. The spring element 62 may assist in the retraction of the piston portion 25. It is noted that the accordion shaped flexible piston portions 25B may intrinsically have sufficient elasticity to provide for this retraction. The spring element 62 ensures that after many cycles of operation, retraction of the piston portion 25 is still guaranteed.

When the distribution plate 26 loses contact with the container 11, due to the retraction, the valve 60 closes. In fact, the spring element 61 ensures that the valve 60 closes slightly before contact with the container 11 is lost to prevent water from the boiler 9 to flow in the brew chamber 10 at this stage.

Figure 11:
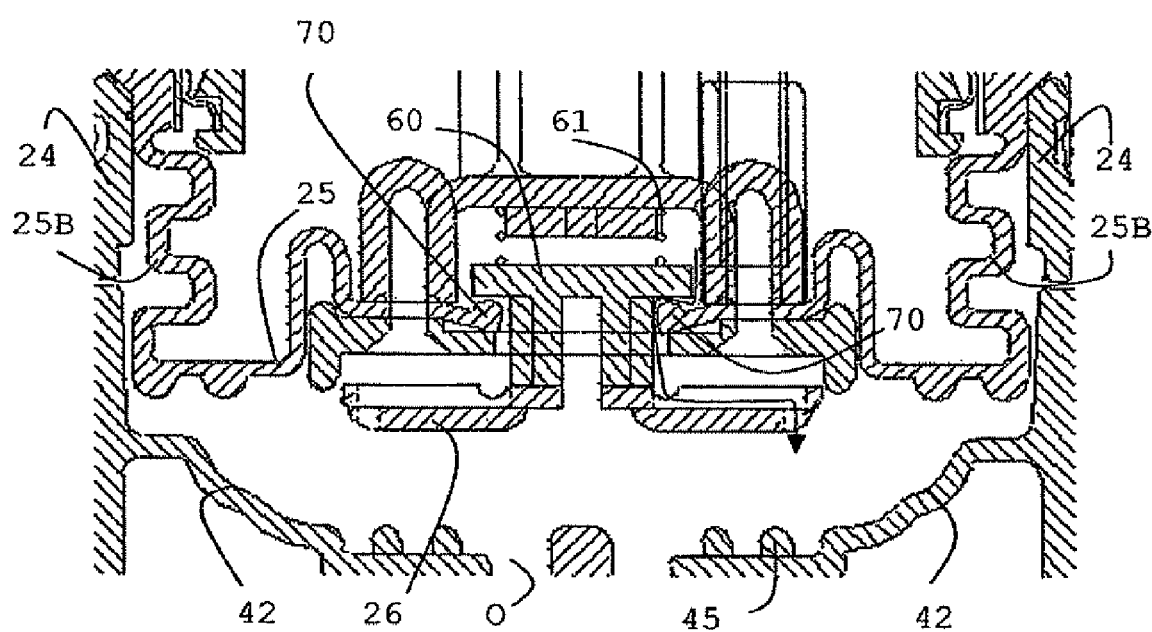
FIG. 11 illustrates the function of the overpressure valve integrated in the piston portion according to an embodiment of the invention.

The cover member 12 further comprises an overpressure valve 70, as displayed in FIG. 11. The overpressure valve 70 is integrated in the flexible piston portion 25 that allows water to pass the piston portion 25 without opening of the valve 60, indicated by the arrow. The overpressure valve 70 prevents flexible piston portion to overstretch if e.g. no container is present in the holder 14 or if the holder 14 is absent.

The invention claimed is:

1. An apparatus for preparing a beverage comprising:
a brew chamber defining a volume for containing at least one container with a soluble or extractable product for preparing said beverage;
a heating device configured to supply hot water to the brew chamber, and
an adjustment mechanism configured to vary the volume of said brew chamber, wherein said adjustment mechanism comprises:
a holder adapted to support said container; and
a cover member comprising a piston portion adapted to move with respect to said holder in order to vary said volume of said brew chamber wherein that said piston portion is adapted to separate an internal volume of said heating device from said brew chamber.

2. The apparatus according to claim 1, wherein said piston portion is coupled to a spring element arranged to exert spring force action on said piston portion away from said holder.

3. The apparatus according to claim 1, wherein said piston portion comprises a flexible portion.

4. The apparatus according to claim 1, wherein said adjustment mechanism comprises a valve for introducing the hot water from said heating device into said brew chamber.

5. The apparatus according to claim 4, wherein said piston portion comprises said valve.

6. The apparatus according to claim 5, wherein said valve is adapted to open a flow path for water from one side of said piston portion to the other side when contacting said container.

7. The apparatus according to claim 6, wherein said apparatus comprises a spring element arranged to exert spring force action on said valve to close said flow path before, and during an initial phase after, contacting said container.

8. The apparatus according to claim 6, wherein said cover member comprises an overpressure valve.

9. The apparatus according to claim 1, wherein said brew chamber comprises a holder with a non-planar surface defining at least a first holding structure and a second holding structure, respectively arranged to hold containers of at least a first dimension and a second dimension, as defined by an edge of said containers, substantially along said edge of said containers.

10. The apparatus according to claim 1, wherein said brew chamber comprises a cover member and a holder adapted to receive said container, wherein said heating device and said cover member are attached to each other.

11. The apparatus according to claim 1, wherein said apparatus comprises a holder with an access opening adapted to receive said container and a cover member for closing said access opening, wherein said apparatus further comprises a closing device configured to substantially close said access opening and wherein said closing device is adapted to move said holder and said cover member with respect to each other substantially by translation from a non-closed position to a closed position for said access opening.

12. An apparatus for preparing a beverage comprising:
a brew chamber defining a volume for containing at least one container with a soluble or extractable product for preparing said beverage;
a heating device configured to supply hot water to said container, and
an adjustment mechanism configured to vary the volume of said brew chamber, wherein said adjustment mechanism comprises:
a holder adapted to support said container; and
a cover member comprising:
a piston portion adapted to move with respect to said holder in order to vary said volume of said brew chamber wherein that said piston portion is adapted to separate an internal volume of said heating device from said brew chamber; and
at least one flexible wing extending from a perimeter of the piston portion that engage the holder to close the volume of the brew chamber.

13. An apparatus for preparing a beverage comprising:
a heating device configured to supply hot water to said container;
a conduit connecting a water supply from the heating device to a brew chamber wherein the brew chamber defining a volume for containing at least one container with a soluble or extractable product for preparing said beverage;
a pump in fluid communication with the conduit to provide water under pressure to the brew chamber;
an adjustment mechanism configured to vary the volume of said brew chamber, wherein said adjustment mechanism comprises:
a holder adapted to support said container; and
a cover member comprising:
a piston portion adapted to move with respect to said holder in order to vary said volume of said brew chamber wherein that said piston portion is adapted to separate an internal volume of said heating device from said brew chamber; and
an accordion-shaped portion extending from a perimeter of the piston portion that extends and contracts to facilitate movement of the piston portion.

14. The apparatus of claim 13 and further comprising a valve in fluid communication with the conduit wherein the valve is positionable to allow water into the brew chamber or to prevent water from entering into the brew chamber.

* * * * *